Sept. 12, 1933. L. BURRELL ET AL 1,926,327
METHOD OF AND APPARATUS FOR DETERMINING DEVIATION IN DRILLING WELLS
Filed Dec. 26, 1929
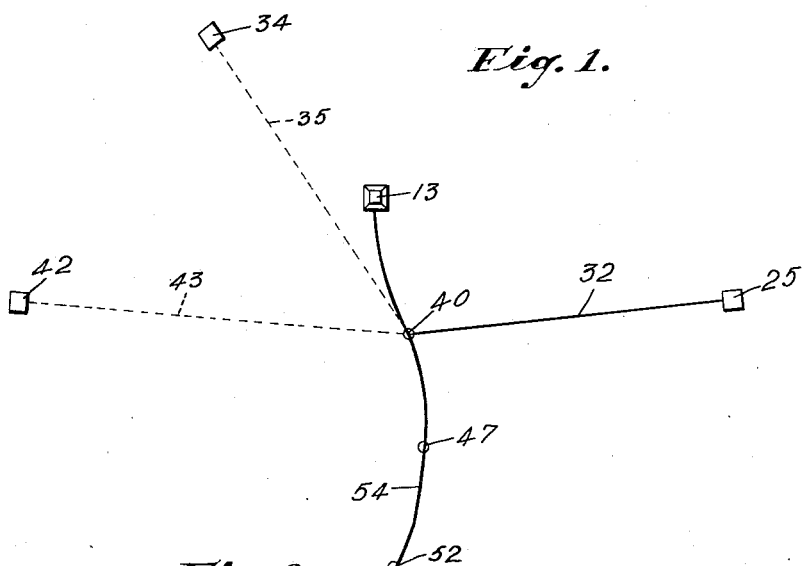
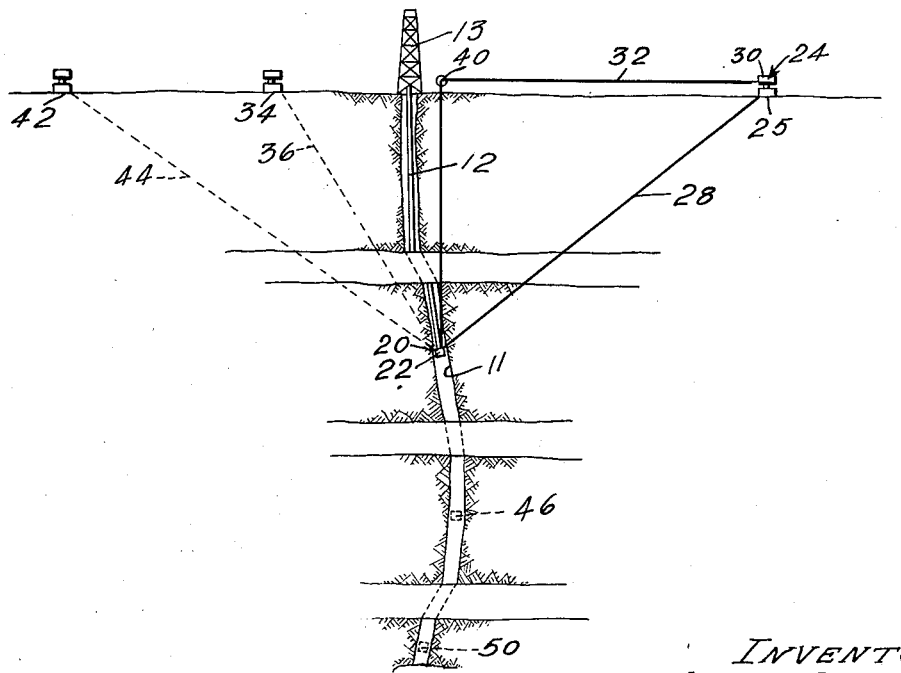
INVENTORS:
Logan Burrell,
Henry West,
BY
ATTORNEY.

Patented Sept. 12, 1933

1,926,327

UNITED STATES PATENT OFFICE 1,926,327

METHOD OF AND APPARATUS FOR DETERMINING DEVIATION IN DRILLING WELLS

Logan Burrell and Henry West, Los Angeles, Calif., assignors to Shell Oil Company, San Francisco, Calif., a corporation of California Application December 26, 1929
Serial No. 416,543

6 Claims. (Cl. 250—11)

Our invention relates to a method of and apparatus for determining the deviation of a well.

When drilling oil wells it frequently happens that the drill bit strikes a hard strata, or a boulder and is deflected so that the hole dug thereby is crooked and deviates from the vertical. It is very desirable to know where the deviation occurs and the amount and direction of the deviation so as to be able to cement in and re-drill the well, if necessary, to prevent the deviation from becoming too great.

Many devices have been invented to determine this deviation, these devices usually employing a means for determining the inclination to the vertical of a particular portion of the hole so that by calculation it is possible to determine the amount of deviation. Such devices are often complicated to use and have the disadvantage that the deviation is not given directly, but must be calculated.

It is an object of our invention to provide a method of determining the deviation of a well in which the deviation may be measured directly from the projection of the well on the surface of the ground.

Another object is to provide a method of determining the projection of the well on the surface of the ground, which method consists in determining the projected positions on the surface of the ground of a plurality of points in the well and determining a line through the points to determine the projection of the well.

A further object is to provide a method of locating from the surface of the ground the projected positions of the points in the well.

It is also an object to provide a method of locating a point in a well from a point at the surface of the ground, which method consists in transmitting a wave motion between the points, the direction of the wave motion between the points indicating the direction of the points relative to each other.

Another object is to provide a method of the above class in which a wave is transmitted from a point in the well and is received at a plurality of stations at the surface, the intersection of the various directions from which the wave motion was received at the stations being determined in order to locate the point.

A further object is to provide a method of the above class in which radio waves are transmitted by a transmitter.

Another object is to provide suitable apparatus for accomplishing the above methods.

Further objects of our invention will be made evident in the ensuing description.

In the drawing,—

Fig. 1 is a plan view of the surface of the ground above a well showing a preferred method of accomplishing our invention.

Fig. 2 is a sectional view taken through the well.

Referring to the drawing, we show a well 11 which has been dug by a bit secured to the lower end of a drill pipe 12 controlled from a derrick 13 at the surface of the ground. Due to the drill pipe 12 being deflected at a number of points, the well 11 has been dug crooked and has deviated from the vertical, as shown in Fig. 2.

In order to determine the amount of such deviation, we provide a radio transmitter 20, which may be of any well-known type, operable to transmit radio waves therefrom. In the preferred form of our invention, the radio transmitter 20 is secured to the lower end of the drill pipe 12 and is lowered thereby to a point 22 in the well 11. Operation of the transmitter 20 is then started and radio waves are transmitted thereby, the radio waves passing through the ground in all directions and outward into the space above the ground, as is well known. The radio waves transmitted by the transmitter 20 are received by a receiver 24 which is located at a point 25 at the surface of the ground, the radio waves passing between the points 22 and 25 along a direction line 28.

It will be readily seen that in order to determine the direction of the point 22 relative to the point 25, it is only necessary to determine the direction line 28 along which the radio waves pass between the points 22 and 25. This may be determined by providing a directional determining device on the receiver 24 for determining the direction from which the radio waves sent out by 20 are received. In the preferred form of our invention, however, we prefer to determine only the projection parallel to the surface of the ground of the line 28, which projection is horizontal in the case shown. This is determined by making the directional determining device on the transmitter 20 a loop aerial 30 which is mounted for rotation about a vertical axis. The loop aerial 30 is rotated until the signals as received by the receiver 24 from the transmitter 20 are loudest at which time the plane of the loop aerial 30 coincides with a vertical plane passing through the points 22 and 25. A line 32 parallel to the surface of the ground may then be determined by the direction of the loop aerial, which line 32 lies in the vertical plane passing through the points 22 and 25 and is the projection of the line 28 on the surface of the ground.

The receiver 24 is then moved to a point 34 and the operation is repeated to determine a line 35 which is the projection on the surface of the ground of a line 36 along which radio waves transmitted by the transmitter 20 pass between the points 22 and 34. The intersection of lines 32 and 35 is a point 40 which is the projected position of the point 22 on the surface of the ground. We prefer to repeat the above operation at a third point 42 on the surface of the ground in order to determine a line 43 which is a projected position of a line 44 along which the radio waves pass between the points 22 and 42. The intersection of the line 43 with the lines 32 and 35 is then determined to provide a check on the position of the point 40 as determined by the lines 32 and 35.

Having determined the projection of the point 22 on the surface of the ground to be point 40, we then lower the drill pipe 12 so as to move the transmitter 20 to a point 46 in the well and repeat the above operation to determine the projected position of the point 46 on the surface of the ground, this being found to be a point 47. The transmitter 20 is then lowered to a point 50 which may be at the bottom of the well 11, and the projected position of the point 50 obtained in a like manner, point 52 being thus determined to be the projection of the point 50. The projected positions of other points may be determined in a like manner, if desired. A line 54 passing through the derrick 13 and the points 40, 47 and 52 is then determined graphically by other means, the line 54 being the projection of the well 11 on the surface of the ground. Having determined the projection of the well 11, the deviation between any two points may be readily obtained by measurement.

It should be noted that the above method was based on the assumption that the transmitter 20 was located at a point in the well 11 and that the receiver 24 was located at a point on the surface of the ground. It should be understood that we are not limited to this arrangement, as the receiver 24 may be positioned at points in the well 11 and the transmitter 20 may be positioned at points on the surface of the ground, if desired. When the receiver 24 and the transmitter 20 are so positioned, the drill pipe 12 is rotated in order to rotate the transmitter 20 and the directional determining device secured thereto so that the signals as received by the transmitter 20 when located at one of the points, such as 25, are loudest, the directional determining device of the transmitter 20 being then in a position to indicate the direction of the point 25 from the point 22, this being the line 32, as already explained. The transmitter 20 is then moved to the other points 34 and 42 and the directions of the lines 35 and 43 determined in a like manner.

It should be understood, however, that the transmitter 20 may be equipped with the directional transmitting apparatus, this apparatus being of a type which is well known in the radio art and which transmits radio waves in one direction from the transmitter 20. When such is the case, the directional transmitting apparatus of the transmitter 20 is rotated until the signals are received by the receiver 24. The direction of the directional transmitting apparatus on the transmitter 20 then indicates the direction of the receiver 24 from the transmitter 20. It will thus be seen that the location of a point in the well relative to a point on the surface of the ground is determined by transmitting a wave motion between the point in the well and the point on the surface of the ground and determining the direction along which the wave motion passes between the points as an indication of the direction of the points relative to each other.

It should also be noted that only one point on the surface of the ground is required to give the direction of a point in the well from the point on the surface of the ground, and that only two points on the surface of the ground are required to give a complete location of any point in the well, since the intersection of two of the direction lines 32, 35 or 43 will be a point. However, as stated above, we prefer to use three or more stations, as each station used gives a more definite determination of the projected position of the point in the well.

It is within the scope of our invention to use the deviation determining apparatus during the time that the drill bit is drilling the well, such an arrangement making it possible to determine the deviation as the well is dug.

Our invention may also be used to determine the depth of a point, such as point 22, in the well by the method shown in Fig. 2. In this case the loop aerial 30 is turned so that it rotates about a horizontal axis and is operable to indicate the vertical direction of the point 22 relative to a point on the surface, such as the point 25, this being determined to be the line 28 as will be readily apparent. Direction lines may be taken from two or more stations on the surface of the ground and the intersection of such lines gives the vertical position of the point 22 relative to the points on the surface of the ground and thus gives the depth of the point 22 below the surface of the ground.

Although we have described and claimed the radio transmitter 20 as transmitting radio waves, it should be understood that we are only providing an explanation of the operation in accordance with an accepted theory of the radio method of transmitting energy between two points. Whether this be a wave motion or other type of energy transferred is immaterial to the operation of our invention, as long as the direction from which the radio transmission is received may be determined. Furthermore, it is conceivable that other types of wave motion may be employed for this purpose without departing from the spirit of our invention.

We claim as our invention:

1. A method of determining the deviation during the drilling of a well, which includes the steps of: transmitting a wave motion from a point within the well, said point being near the bottom of the well; receiving said wave motion at a plurality of points on the surface of the ground; determining the directions between the transmitting and receiving points; determining the intersection of said directions as an indication of the position of the transmitting point; and determining the vertical projection of said intersection on the surface of the ground as an indication of the deviation of the well.

2. A method of determining the vertical projection of a well on the surface of the ground, which includes the steps of: transmitting a wave motion between a point in said well and a plurality of points on the surface of the ground; determining the directions between said point in the well and the points on the surface of the ground;

determining the intersection of said directions; and determining the vertical projection of said intersection on the surface of the ground; and repeating the same method for determining vertical projections of other points along the bore of the well, as indications of the outline of the vertical projection of the well on the surface of the ground.

3. The method of determining the outline of a borehole comprising the steps: transmitting radio signals from a point within the borehole; receiving said signals at two or more points on the surface of the ground; determining the straight line directions between the transmitting and receiving points; determining the intersection point of said directions, as an indication of the true position of the transmitting point; and repeating the same steps for locating one or more additional points along the borehole, as indications of the borehole outline.

4. A method of determining the plan view of a well comprising the steps: transmitting a wave motion from a point in the well to at least two receiving points on the surface of the ground; determining vertical plane directions between the transmitting and receiving points; determining plan view of these directions, and the point of their intersection; and determining similar intersection points corresponding to other points in the well as indications of the plan view of the well.

5. The method, as described in claim 4 wherein the operations of transmitting and receiving of the radio signals, and registering of the directions between the transmitting and receiving points is carried on while the well is being drilled.

6. The method for determining the deviation of a borehole from a vertical through its top comprising the steps: transmitting radio signals from a point in the borehole; receiving said signals at two or more points on the surface of the ground; determining vertical plane directions through the transmitting and receiving points; determining the intersection line of said directions and its vertical projection on the surface, as an indication of said deviation.

LOGAN BURRELL.
HENRY WEST.